US012742530B2

(12) United States Patent
Kim et al.

(10) Patent No.: US 12,742,530 B2
(45) Date of Patent: Sep. 22, 2026

(54) VEHICLE LAMP HAVING MAIN AND SUB LIGHT SOURCES, AND CORRESPONDING LENS PORTIONS

(71) Applicant: SL Corporation, Daegu (KR)

(72) Inventors: Kaehong Kim, Gyeongsan-si (KR); Hyojin Han, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 19/321,094

(22) Filed: Sep. 5, 2025

(65) Prior Publication Data

US 2026/0071731 A1 Mar. 12, 2026

Related U.S. Application Data

(63) Continuation of application No. PCT/KR2024/095187, filed on Feb. 15, 2024.

(30) Foreign Application Priority Data

Mar. 6, 2023 (KR) ........................ 10-2023-0029338
Jul. 13, 2023 (KR) ........................ 10-2023-0090854

(51) Int. Cl.

| | |
|---|---|
| ***F21S 41/265*** | (2018.01) |
| ***F21S 41/143*** | (2018.01) |
| ***F21S 41/20*** | (2018.01) |
| ***F21S 41/32*** | (2018.01) |
| ***F21S 41/40*** | (2018.01) |
| ***F21V 5/08*** | (2006.01) |

(52) U.S. Cl.

CPC ........... *F21S 41/265* (2018.01); *F21S 41/143* (2018.01); *F21S 41/285* (2018.01); *F21S 41/32* (2018.01); *F21S 41/40* (2018.01)

(58) Field of Classification Search

CPC ........ F21S 41/265; F21S 41/143; F21S 41/40; F21S 41/43; F21S 41/285; F21S 41/62; F21S 41/147; F21S 41/151; F21S 41/47; F21S 41/24; F21S 41/321; F21V 5/08; B60Q 1/04; B60Q 1/16

See application file for complete search history.

(56) References Cited

U.S. PATENT DOCUMENTS 6,611,382 B2 * 8/2003 Hashimoto ........ G02B 19/0014 359/619
9,879,838 B2 * 1/2018 Meyrenaud ........... F21S 41/265
10,006,600 B2 * 6/2018 Jo ........................... F21S 43/26

(Continued)

*Primary Examiner* — Ismael Negron

(74) *Attorney, Agent, or Firm* — United One Law Group LLC; Kongsik Kim; Jhongwoo Peck

(57) ABSTRACT

A vehicle lamp includes a light source portion that generates light; and a light path adjustment portion for adjusting the path of the light generated by the light source portion; and an optical portion for transmitting at least a portion of the light incident from the light path adjustment portion to allow at least one beam pattern to be formed. The light source portion includes a main light source for forming a main beam pattern; and at least one sub-light source for forming a sub-beam pattern. The optical portion includes an incident lens portion and an emitting lens portion that face each other. The incident lens portion includes incident lenses on an incident surface thereof, and the emitting lens portion includes emitting lenses, corresponding to the incident lenses, on an emitting surface thereof.

15 Claims, 18 Drawing Sheets

(56) References Cited

U.S. PATENT DOCUMENTS

| | | | | |
|---|---|---|---|---|
| 10,174,903 | B2 * | 1/2019 | Jung | F21S 41/265 |
| 10,670,214 | B2 * | 6/2020 | Nakazawa | F21S 41/143 |
| 11,236,870 | B2 * | 2/2022 | Van Der Sijde | F21S 41/265 |
| 11,668,449 | B2 * | 6/2023 | Go | F21S 41/265<br>362/511 |
| 11,698,175 | B2 * | 7/2023 | Vogelauer | F21S 41/143<br>362/459 |
| 11,982,415 | B1 * | 5/2024 | Nam | F21S 41/265 |
| 2018/0313511 | A1 * | 11/2018 | Lee | F21S 41/143 |
| 2024/0337361 | A1 * | 10/2024 | Knobloch | F21S 41/143 |
| 2026/0063266 | A1 * | 3/2026 | Jin | F21S 41/143 |
| 2026/0071732 | A1 * | 3/2026 | Lee | F21S 41/265 |

* cited by examiner

VEHICLE LAMP HAVING MAIN AND SUB LIGHT SOURCES, AND CORRESPONDING LENS PORTIONS

CROSS-REFERENCE TO RELATED APPLICATIONS

This application is a Continuation of International Application No. PCT/KR2024/095187 filed Feb. 15, 2024, which claims priority from Korean Application Nos. 10-2023-0029338 filed Mar. 6, 2023 and 10-2023-0090854 filed Jul. 13, 2023. The aforementioned applications are incorporated herein by reference in their entireties.

TECHNICAL FIELD

The present disclosure relates to a vehicle lamp, and more particularly, to a vehicle lamp capable of forming different beam patterns.

RELATED ART

In general, vehicles are equipped with various types of lamps that serve an illumination function to allow easier identification of objects located around the vehicles during low-light conditions (e.g., nighttime driving) and a signaling function to inform other vehicles or road users of the driving status of the vehicles.

For example, headlamps and fog lamps are primarily intended for the illumination function, while turn signal lamps, tail lamps, and brake lamps are primarily intended for the signaling function. Such lamps are regulated by law with respect to installation standards and specifications so that each function can be fully achieved.

Such a vehicle lamp includes an optical system for forming a beam pattern corresponding to each function. However, when separate optical systems are provided to form two or more different beam patterns, the number of components increases and the cost also increases.

Therefore, there is a need for a solution that enables the sharing of an optical system for forming different beam patterns, thereby reducing the number of components and decreasing the cost.

SUMMARY

One objective of the present disclosure is to provide a vehicle lamp capable of enabling sharing of at least parts of an optical system for forming different beam patterns, thereby reducing the number of components and lowering the cost.

The objectives of the present disclosure are not limited to those mentioned above, and other objectives not explicitly stated will be clearly understood by those skilled in the art based on the following description.

According to an aspect of the present disclosure, a vehicle lamp may include a light source portion that generates light; a light path adjustment portion that adjusts a path of the light emitted from the light source portion; and an optical portion that transmits at least a portion of the light incident from the light path adjustment portion to allow at least one beam pattern to be formed. The light source portion may include a main light source for forming a main beam pattern; and at least one sub-light source for generating light for forming a sub-beam pattern. The optical portion may include an incident lens portion, which includes a first light-transmitting portion and a plurality of incident lenses disposed on an incident surface of the first light-transmitting portion; and an emitting lens portion, which includes a second light-transmitting portion having an incident surface thereof facing an emitting surface of the first light-transmitting portion and a plurality of emission lenses disposed on an emitting surface of the second light-transmitting portion to correspond to the plurality of incident lenses.

The vehicle lamp may further include a reflector that reflects at least a portion of the light emitted from the at least one sub-light source to cause it to proceed toward the optical portion.

The vehicle lamp may further include at least one guide lens that guides the light emitted from the at least one sub-light source to be incident on the light path adjustment portion. The at least one guide lens may include a diffusion pattern formed on at least one of an incident surface or an emitting surface thereof for diffusing light.

Each of the at least one sub-light source may be disposed above or below the main light source.

The at least one sub-light source may include: a first sub-light source disposed above the main light source; and a second sub-light source disposed below the main light source. The first sub-light source may be disposed near a top end of the light path adjustment portion.

Light emitted from the first sub-light source may be guided to be incident on the light path adjustment portion by a first guide lens, and light emitted from the second sub-light source may be guided to be incident on the light path adjustment portion by a second guide lens. The second guide lens may be disposed farther from the light path adjustment portion than the first guide lens.

The first guide lens may be inclined front-downward to allow the light emitted from the first sub-light source to proceed with a front-downward inclination.

The at least one sub-light source may be disposed below the main light source.

The vehicle lamp may further include a holder formed on at least a portion of a side surface of the light path adjustment portion to fix a position of the light path adjustment portion. The holder may include a mounting portion formed at a front end thereof for mounting the optical portion therein.

A thickness of the first light-transmitting portion may be greater than a thickness of the second light-transmitting portion.

The vehicle lamp may further include a plurality of first shields disposed between the first light-transmitting portion and the second light-transmitting portion, and the plurality of first shields may block a portion of light that proceeds toward the plurality of emission lenses.

The vehicle lamp may further include a plurality of second shields disposed in front of the plurality of first shields, and upper ends of the plurality of second shields may be disposed below upper ends of corresponding first shields among the plurality of first shields.

Other specific details of the present disclosure are included in the detailed description and the drawings.

According to the vehicle lamp of the present disclosure as described above, the following effects may be achieved, individually or in combination.

Since some of the components for forming different beam patterns can be shared, the number of components required to form different beam patterns can be reduced, thereby achieving a cost-reduction effect.

It should be noted that the effects of the present disclosure are not limited to those described above, and other effects of the present disclosure will be apparent from the following description.

DETAILED DESCRIPTION

Figure 1:
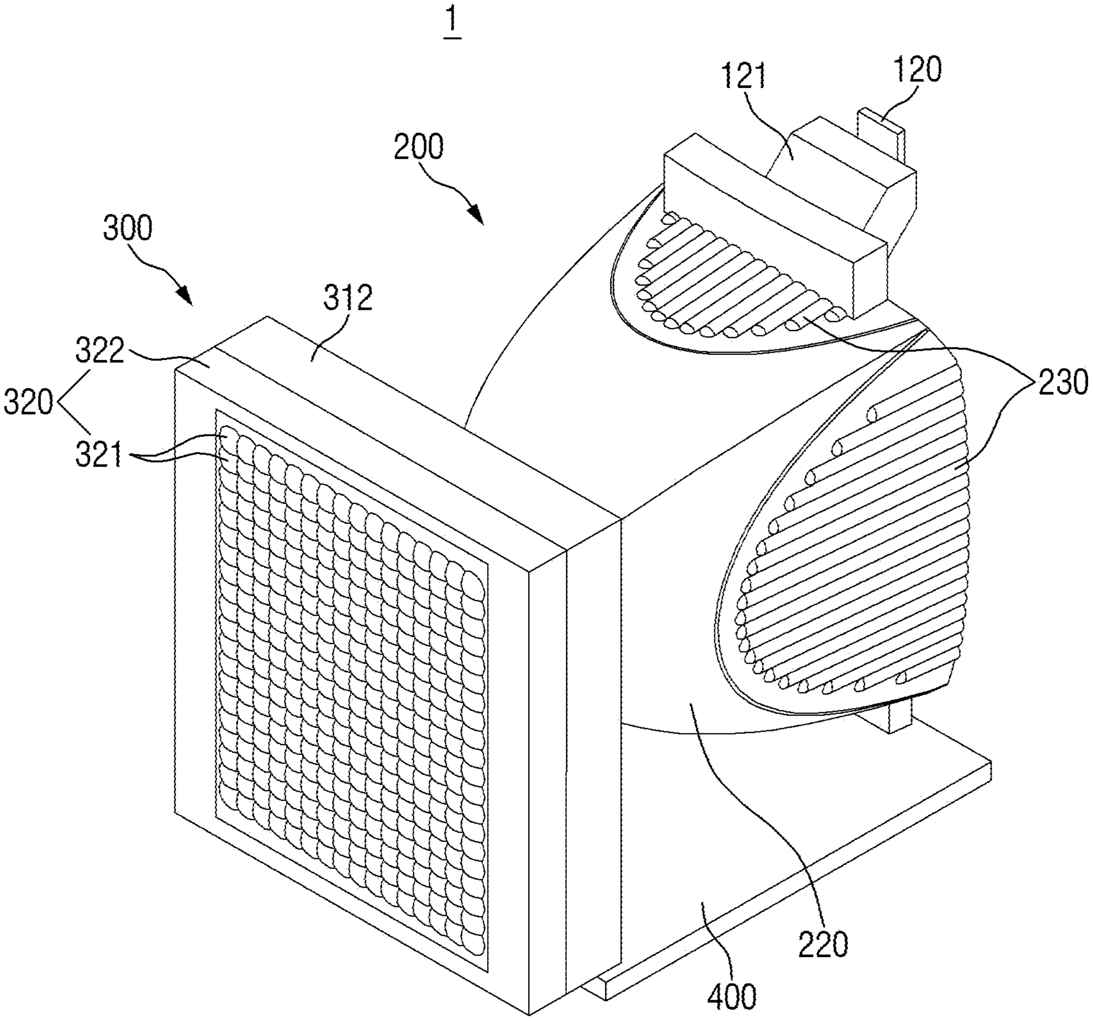
FIGS. 1 and 2 are perspective views illustrating a vehicle lamp according to an embodiment of the present disclosure.

The advantages and features of the present disclosure, and methods for achieving them, will become apparent with reference to the embodiments to be described in detail below in conjunction with the accompanying drawings. However, the present disclosure is not limited to those embodiments, but may be implemented in various different forms. The embodiments are merely provided to fully disclose the scope of the present disclosure and to completely inform those skilled in the art of the scope of the disclosure, and the present disclosure is defined only by the scope of the claims. Throughout the specification, like reference numerals refer to like elements.

Accordingly, in some embodiments, well-known process steps, structures, and technologies are not described in detail in order to avoid ambiguous interpretation of the present disclosure.

The terminology used in this specification is intended to describe the embodiments and is not intended to limit the scope of the present disclosure. As used herein, the singular forms include plural forms as well unless explicitly stated otherwise. The terms "comprises" and/or "comprising," as used herein, specify the presence of stated components, steps, operations, and/or elements but do not preclude the presence or addition of one or more other components, steps, operations, and/or elements. The term "and/or" includes each and all possible combinations of one or more of the associated listed items.

In addition, the embodiments disclosed in this specification will be described with reference to cross-sectional views and/or schematic views, which are exemplary illustrations of the present disclosure. Therefore, modifications to the illustrated forms may occur due to manufacturing techniques and/or tolerances. Accordingly, the embodiments of the present disclosure are not limited to the specific forms depicted but include variations in shape resulting from the manufacturing processes. Also, in the drawings of the present disclosure, elements may be illustrated as being enlarged or reduced for convenience of description. Like reference numerals refer to like elements throughout the specification.

The present disclosure will hereinafter be described with reference to the accompanying drawings for explaining vehicle lamps according to embodiments of the present disclosure.

Figure 2:
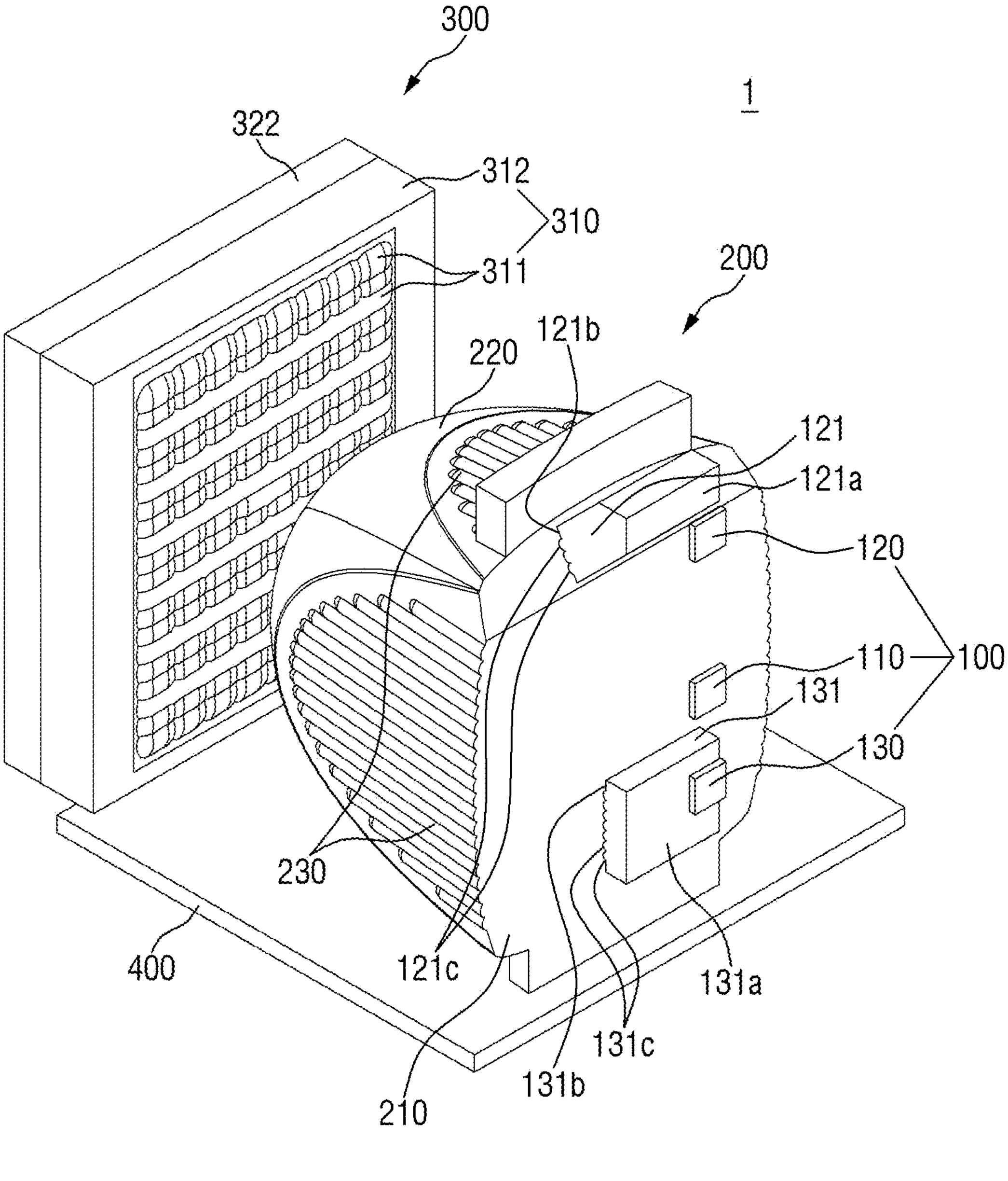
Figure 3:
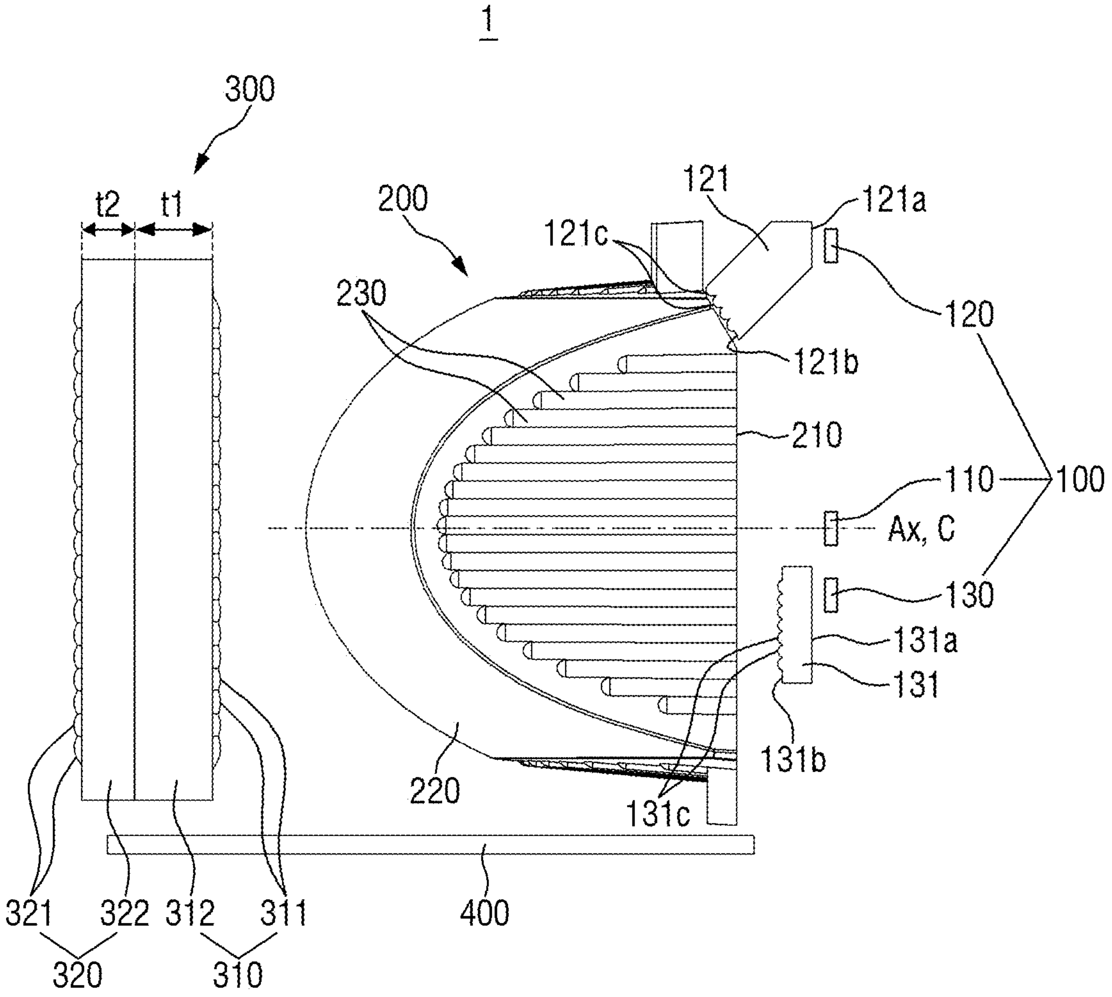
FIG. 3 is a side view illustrating the vehicle lamp according to an embodiment of the present disclosure.

FIGS. 1 and 2 are perspective views illustrating a vehicle lamp according to an embodiment of the present disclosure, and FIG. 3 is a side view illustrating the vehicle lamp according to an embodiment of the present disclosure.

Referring to FIGS. 1 through 3, a vehicle lamp 1 according to an embodiment of the present disclosure may include a light source portion 100, a light path adjustment portion 200, and an optical portion 300.

In this embodiment, the vehicle lamp 1 of the present disclosure is described by way of example as being used for a headlamp that irradiates light in the proceeding direction of a vehicle when the vehicle is being operated at low-light conditions (e.g. at night) so that the driver's forward field of vision is secured. However, the vehicle lamp 1 of the present disclosure is not limited to use in a headlamp and may be used for various other types of vehicle lamps, such as a tail lamp, brake lamp, fog lamp, position lamp, turn signal lamp, daytime running lamp, and backup lamp. The vehicle lamp 1 may be used for only one of the aforementioned purposes or for two or more of them together.

When used as a headlamp, the vehicle lamp 1 of the present disclosure may form at least one of a low-beam pattern, which irradiates light below a predetermined cut-off line to avoid glare for drivers of preceding or oncoming vehicles and secure a wider field of view at close range, or a high-beam pattern, which irradiates light above the low-beam pattern to secure a longer viewing distance for the far front of the vehicle.

The light source portion 100 may include a main light source 110 and at least one sub-light source 120 and 130.

Figure 4:
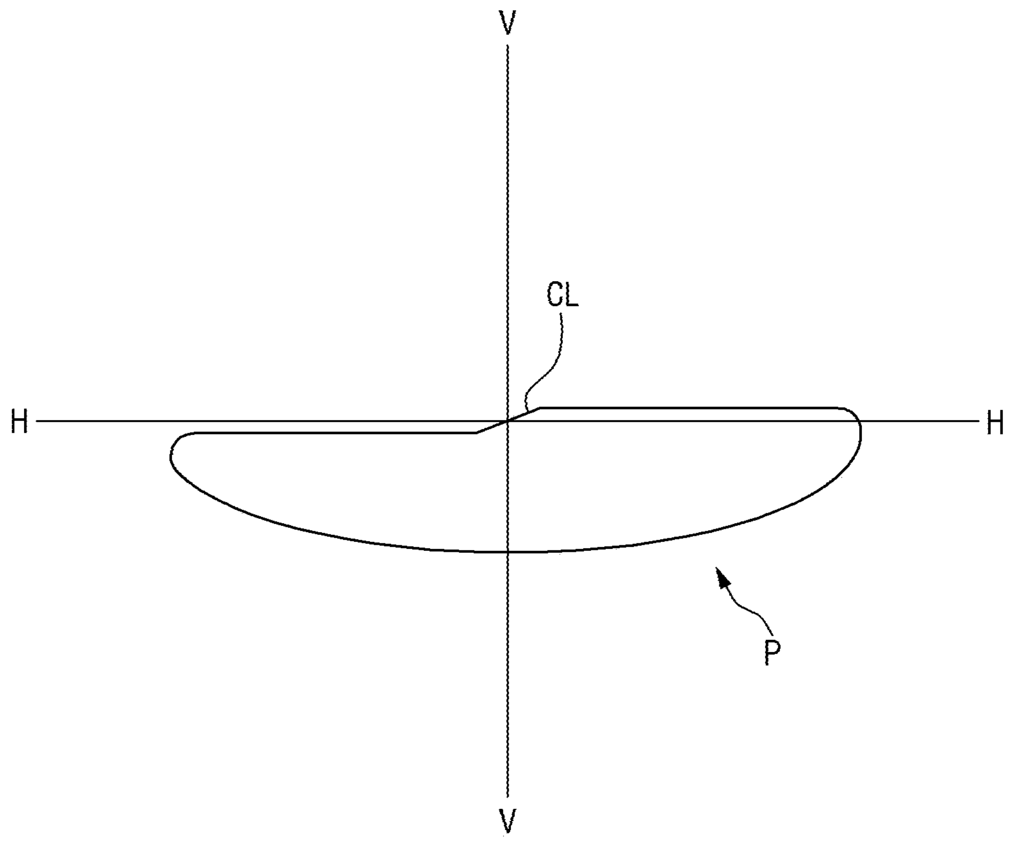
FIG. 4 is a schematic view illustrating a main beam pattern according to an embodiment of the present disclosure.

The main light source 110 may be disposed on a central axis C where the rear focal point of the light path adjustment portion 200 is disposed, and may generate light for forming a main beam pattern. In this embodiment, the main beam pattern is described by way of example as being a low beam pattern P in which the light is emitted below a predetermined cut-off line CL, as depicted in FIG. 4.

Here, the positioning of the main light source 110 on the central axis C of the light path adjustment portion 200 means that an optical axis Ax, which perpendicularly passes through the center of the light-emitting surface of the main light source 110, coincides with the central axis C of the light path adjustment portion 200, or is disposed near the central axis C of the light path adjustment portion 200. In this embodiment, the optical axis Ax of the main light source 110 is described by way of example as being disposed to coincide with the central axis C of the light path adjustment portion 200.

In this embodiment, the main light source 110 is described by way of example as being disposed on the central axis C of the light path adjustment portion 200. However, the present disclosure is not limited thereto, and the main light source 110 may instead be disposed below the central axis C of the light path adjustment portion 200.

The at least one sub-light source 120 and 130 may generate light for forming a sub-beam pattern in a situation where the main beam pattern is not formed by the vehicle lamp 1 of the present disclosure. In this embodiment, the sub-beam pattern is described by way of example as being a beam pattern for a daytime running lamp or a position lamp.

In other words, when the main beam pattern is formed, the main light source 110 may be turned on and the at least one sub-light source 120 and 130 may be turned off. When the sub-beam pattern is formed, the main light source 110 may be turned off and the at least one sub-light source 120 and 130 may be turned on.

Here, in the embodiment of the present disclosure, the at least one sub-light source 120 and 130 is described by way of example as being turned on to form the sub-beam pattern in the situation where the main beam pattern is not formed. However, the present disclosure is not limited thereto, and the at least one sub-light source 120 and 130 may also be turned on together with the main light source 110 when the main beam pattern is formed.

The light emitted from the at least one sub-light source 120 and 130 may be required to be emitted in a front-upward inclined direction so as to be perceptible to the drivers of surrounding vehicles or pedestrians, considering that their viewpoints are higher than the vehicle lamp 1 of the present disclosure. A detailed description of this will be provided below.

In this embodiment, the at least one sub-light source 120 and 130 is described by way of example as including a first sub-light source 120 disposed above the main light source 110 and a second sub-light source 130 disposed below the main light source 110. However, the present disclosure is not limited thereto, and either the first sub-light source 120 or the second sub-light source 130 may be present.

The first sub-light source 120 may be disposed near the upper side (e.g., top end) of the light path adjustment portion 200, and the light generated from the first sub-light source 120 may be guided by a first guide lens 121 to be incident on the light path adjustment portion 200. The first guide lens 121 may be inclined front-downward to allow the light emitted from the first sub-light source 120 to be incident at an inclination in a front-downward direction.

An emitting surface 121*b* of the first guide lens 121 may be disposed proximate to the light path adjustment portion 200 to allow the light emitted from the first guide lens 121 to be incident on the light path adjustment portion 200 without loss.

A diffusion pattern 121*c* for diffusing light may be formed on at least one of an incident surface 121*a* or the emitting surface 121*b* of the first guide lens 121. The diffusion pattern 121*c* may prevent a specific area from having relatively high brightness when the vehicle lamp 1 of the present disclosure is turned on, thereby preventing degradation of uniformity of a lighting image.

In this embodiment, the emitting surface 121*b* of the first guide lens 121 is described by way of example as being surface-treated to have a concave or convex shape and to form the diffusion pattern 121*c*. However, the present disclosure is not limited thereto, and the diffusion pattern 121*c* may be formed on the incident surface 121*a* of the first guide lens 121. The diffusion pattern 121*c* may also be formed through etching or attachment of a separate film, other than surface treatment.

When the light generated from the first sub-light source 120 proceeds at an inclination in the front-downward direction by the first guide lens 121, a portion of the light may fail to be incident on the optical portion 300, resulting in light loss, or even if the light is incident on the optical portion 300, it may be emitted with an inclination in the front-downward direction, a direction more difficult to perceive for surrounding drivers or pedestrians. Therefore, a reflector 400 may be disposed below the light path adjustment portion 200 to reflect the light proceeding front-downward at an inclination from the first sub-light source 120 so that it proceeds with a front-upward inclination.

Figure 5:
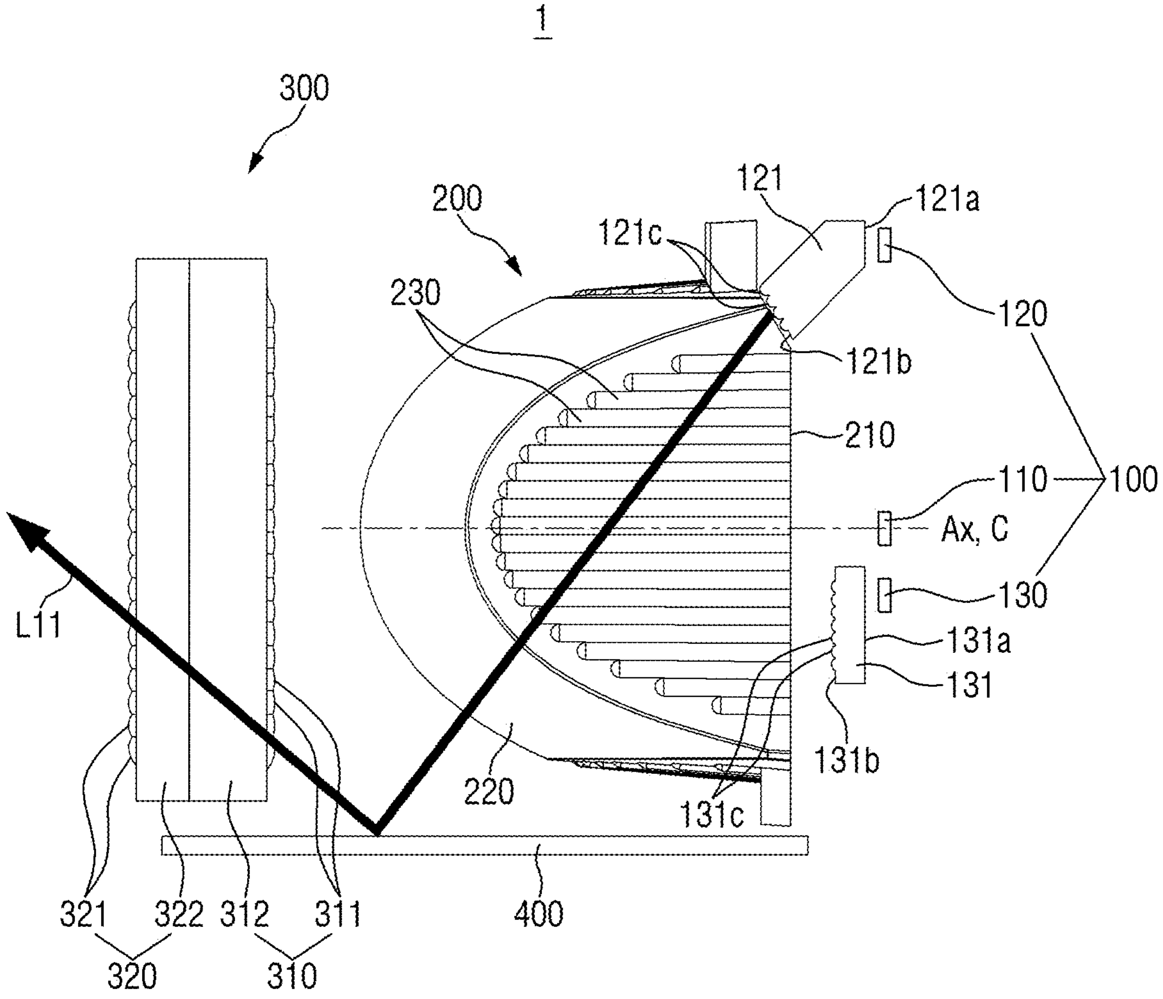
FIG. 5 is a schematic view illustrating the path of light generated from a first sub-light source according to an embodiment of the present disclosure.

FIG. 5 is a schematic view illustrating the path of light emitted from a first sub-light source according to an embodiment of the present disclosure.

Referring to FIG. 5, the light L11 emitted from the first sub-light source 120 disposed near the upper side of the light path adjustment portion 200 may be incident on the light path adjustment portion 200 at an inclination in the front-downward direction by the first guide lens 121. The light L11 incident from the first sub-light source 120 may be reflected by the reflector 400 disposed below the light path adjustment portion 200 to proceed in the front-upward direction, and may then be emitted through the optical portion 300. As a result, the light L11 emitted from the first sub-light source 120 may be perceived by the drivers of surrounding vehicles or pedestrians whose viewpoints are higher than the vehicle lamp 1 of the present disclosure.

The second sub-light source 130 may be disposed near the lower side (e.g., bottom end) of the main light source 110, and the light generated from the second sub-light source 130 may be guided by a second guide lens 131 to be incident on the light path adjustment portion 200.

The second guide lens 131, similar to the first guide lens 121, may have a diffusion pattern 131*c* formed on at least one of an incident surface 131*a* or an emitting surface 131*b* for diffusing light. In this embodiment, the diffusion pattern 131*c* is described by way of example as being formed on the emitting surface 131*b* of the second guide lens 131.

In a case where the second sub-light source 130 is disposed below the main light source 110, it is also disposed below the central axis C where the rear focal point of the light path adjustment portion 200 is disposed. Therefore, the path of light that passes through the light path adjustment portion 200 may be adjusted to proceed at an inclination in the front-upward direction, allowing the drivers of surrounding vehicles or pedestrians to perceive the light emitted from the second sub-light source 130.

Figure 6:
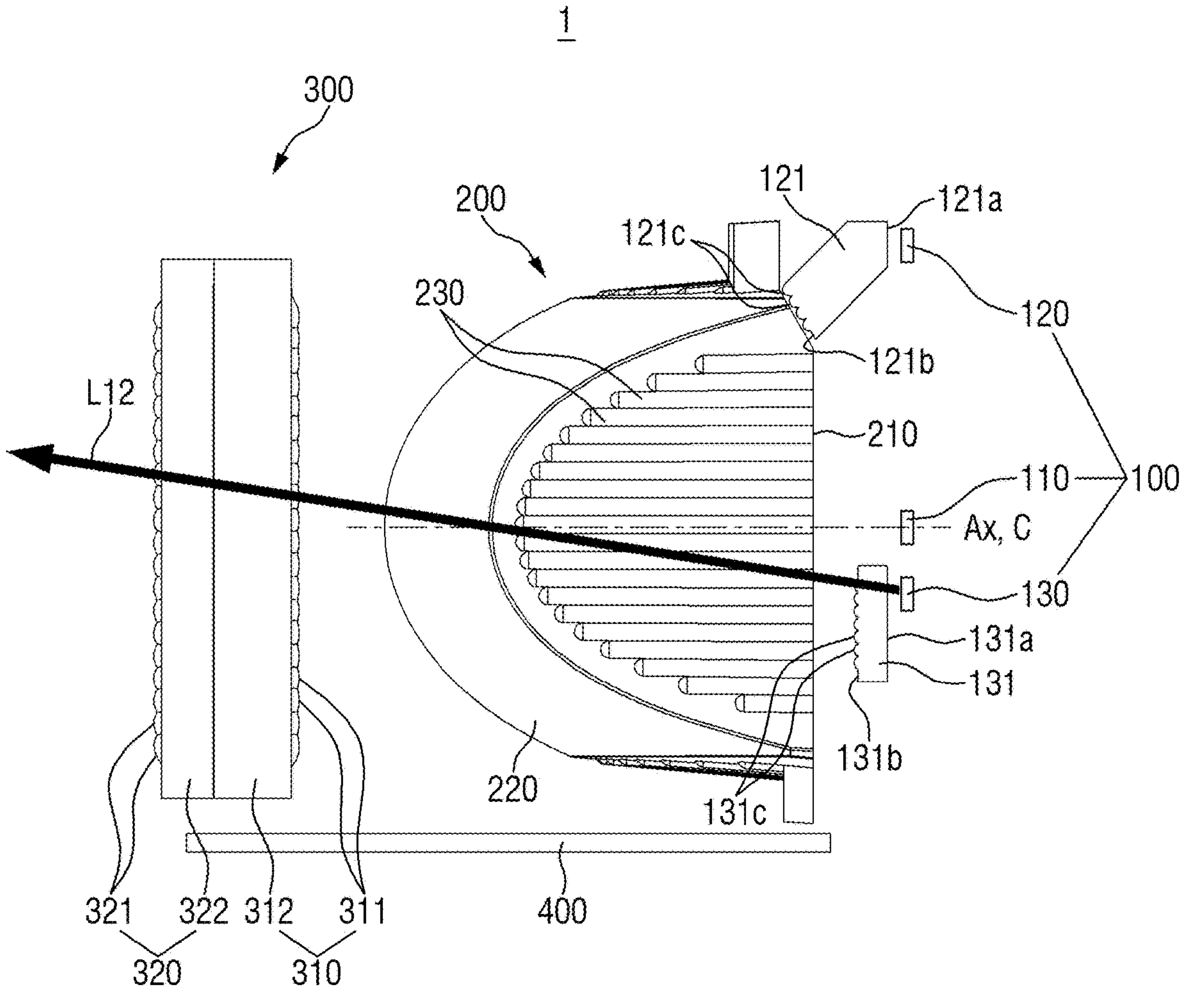
FIG. 6 is a schematic view illustrating the path of light generated from a second sub-light source according to an embodiment of the present disclosure.

FIG. 6 is a schematic view illustrating the path of light emitted from a second sub-light source according to an embodiment of the present disclosure.

Referring to FIG. 6, the light L12 emitted from the second sub-light source 130 disposed near the lower side of the main light source 110 may be guided by the second guide lens 131 to be incident on the light path adjustment portion 200. Since the second sub-light source 130 is disposed below the central axis C of the light path adjustment portion 200, the path of the light L12 emitted from the second sub-light source 130 and incident on the light path adjustment portion 200 may be adjusted to proceed with a front-upward inclination.

Meanwhile, the second guide lens 131 may be disposed farther from the light path adjustment portion 200 than the first guide lens 121. This configuration may prevent interference with the light emitted from the main light source 110, which is generated to have a predetermined irradiation angle.

Figure 7:
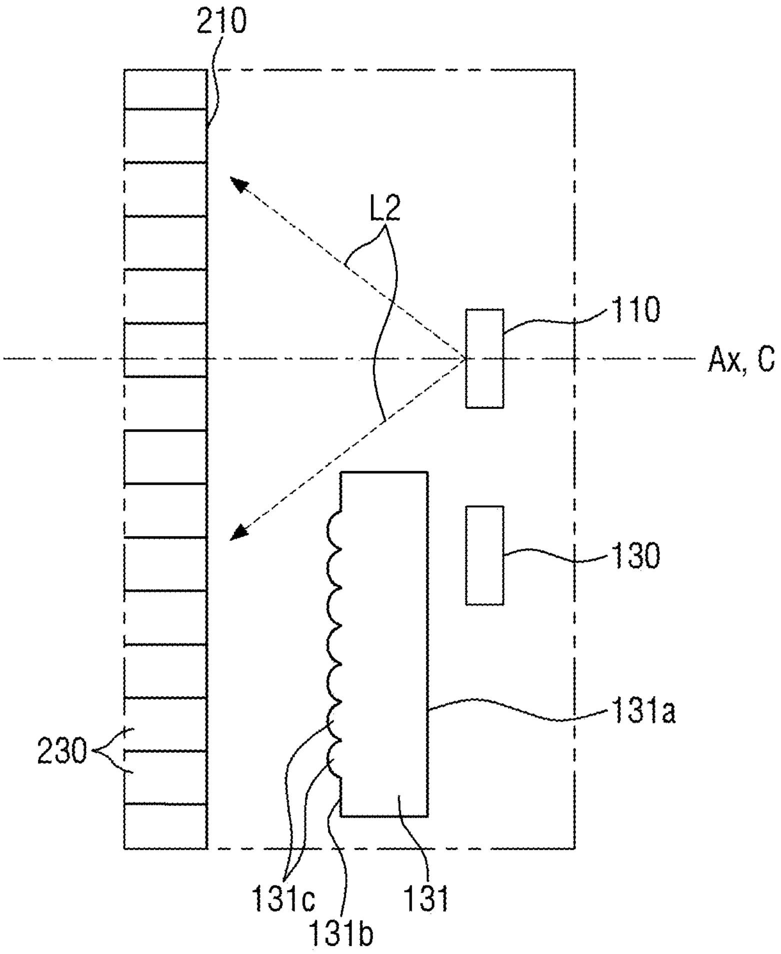
FIG. 7 is a schematic view illustrating a second guide lens spaced apart from a light path adjustment portion according to an embodiment of the present disclosure.

In other words, if the second guide lens 131 is disposed adjacent to the light path adjustment portion 200, there is a concern that it may be disposed on the path of light emitted from the main light source 110, potentially causing interference. Accordingly, in this embodiment, as illustrated in FIG. 7, the second guide lens 131 may disposed outside the path of light L2 emitted from the main light source 110, thereby preventing the light emitted from the main light source 110 from being interfered with by the second guide lens 131.

Figure 8:
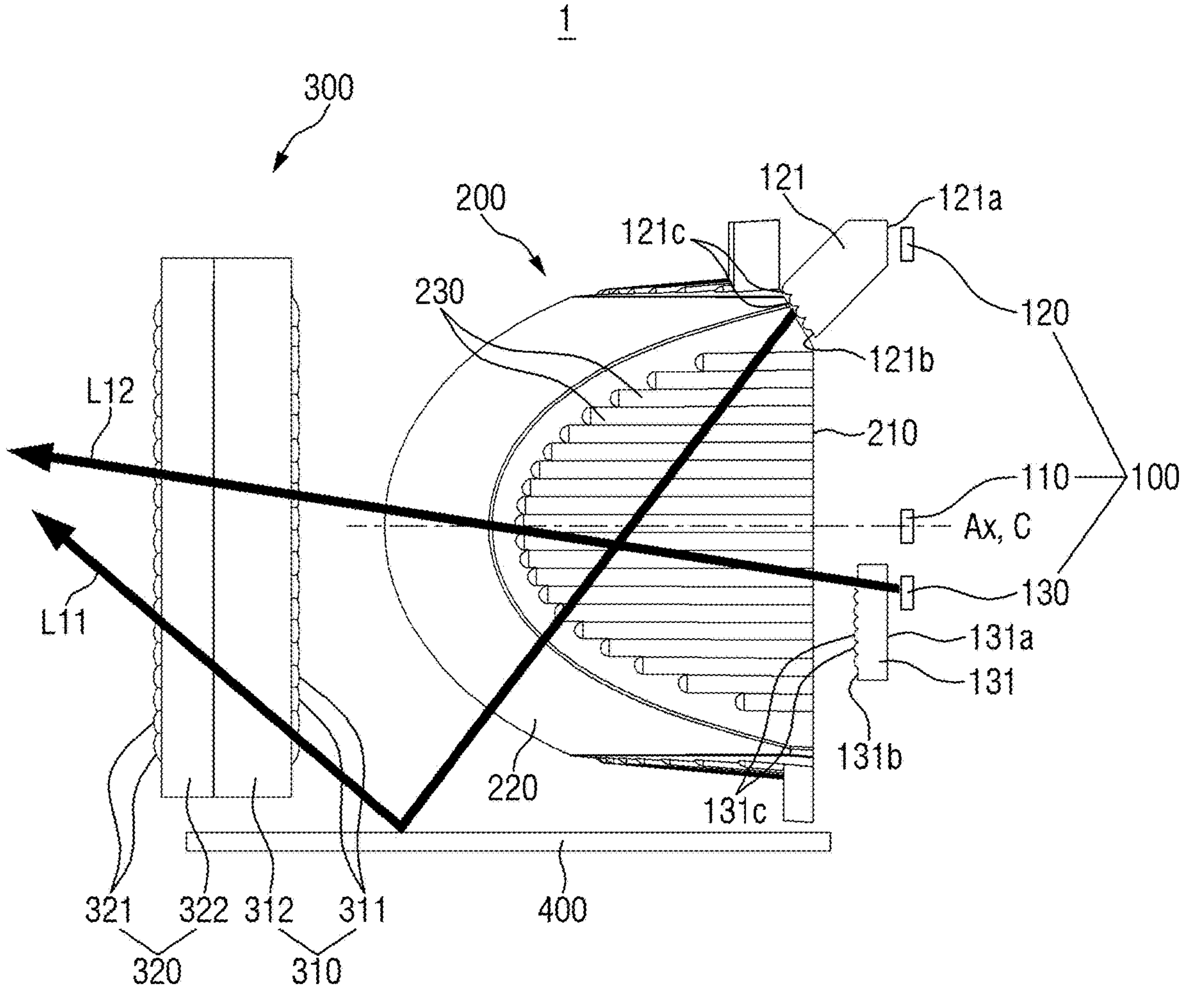
FIG. 8 is a schematic view illustrating the paths of light generated from the first and second sub-light sources according to an embodiment of the present disclosure.

FIG. 8 is a schematic view illustrating the paths of light generated from a first sub-light source and a second sub-light source according to an embodiment of the present disclosure.

Referring to FIG. 8, at least a portion of a region in the optical portion 300 through which light L11, which is emitted from the first sub-light source 120 and reflected by the reflector 400 to proceed with a front-upward inclination, passes is disposed below a region in the optical portion 300 through which light L12, which is emitted from the second sub-light source 130 to proceed with a front-upward inclination, passes. As a result, when a sub-beam pattern is formed by the vehicle lamp 1 of the present disclosure, light may be emitted through substantially the entire area of the optical portion 300, which improves visibility and enhances a lighting image.

In other words, since the light emitted from the first sub-light source 120 is emitted through a relatively lower region of the optical portion 300, there may be a possibility that a lighting image is not formed in an upper region of the optical portion 300. Conversely, since the light emitted from the second sub-light source 130 is emitted through a relatively upper region of the optical portion 300, there may be a possibility that a lighting image is not formed in the lower region of the optical portion 300. However, in this embodiment, since light is emitted through the entire optical portion 300 by both the first and second sub-light sources 120 and 130, a lighting image can be improved.

The light path adjustment portion 200 may serve to adjust the path of light incident from the light source portion 100 to allow the light generated from the light source portion 100 to be incident on the optical portion 300 with minimal loss.

In this embodiment, the light path adjustment portion 200 is described by way of example as being an aspheric lens having a planar incident surface 210 and a convexly formed emitting surface 220 that faces the optical portion 300. However, the present disclosure is not limited thereto, and alternatively, the light path adjustment portion 200 may be implemented using various types of lenses capable of adjusting light paths, such as Fresnel lenses or total internal reflection (TIR) lenses.

In addition, a knurling pattern 230 for diffusing light may be formed on at least a portion of a side surface between the incident surface 210 and the emitting surface 220 of the light path adjustment portion 200. The knurling pattern 230 may prevent glare from occurring to drivers of surrounding vehicles or pedestrians due to light emitted through the side surface of the light path adjustment portion 200.

The optical portion 300 may emit at least a portion of the light generated from the light source portion 100, thereby forming a beam pattern suitable for the intended use of the vehicle lamp 1 of the present disclosure.

Figure 9:
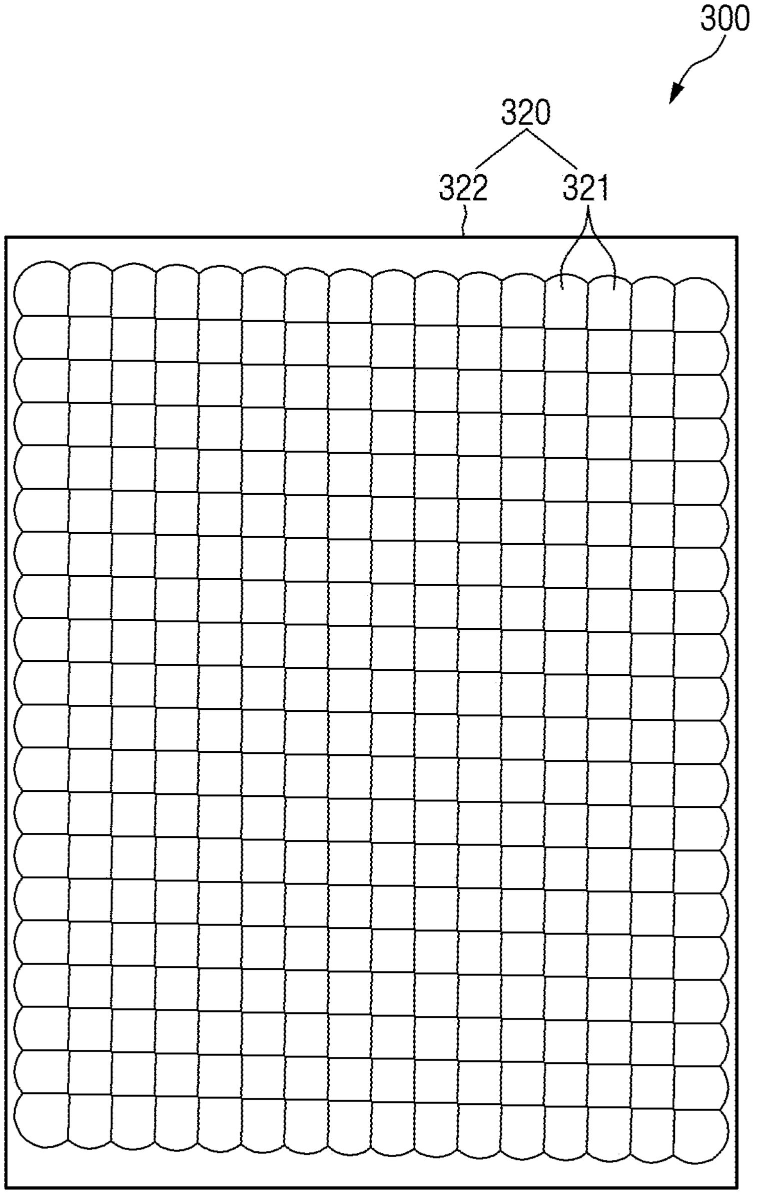
FIG. 9 is a front view illustrating an optical portion according to an embodiment of the present disclosure.
Figure 10:
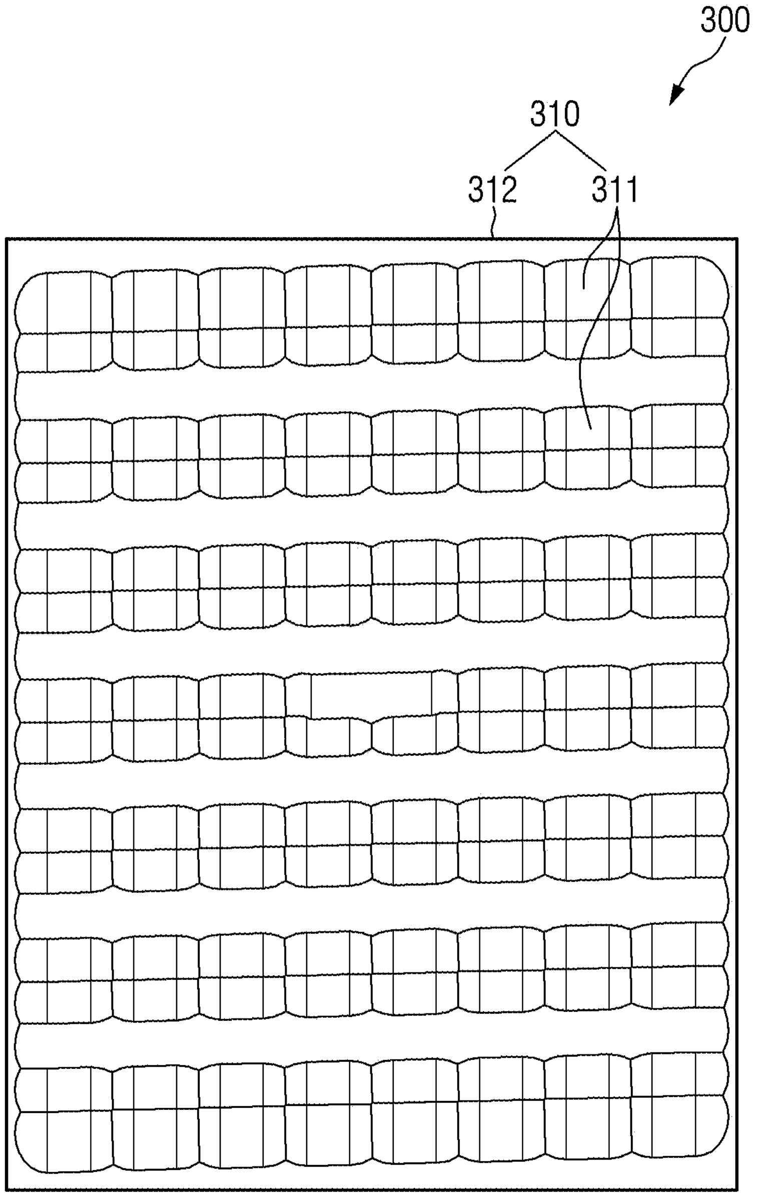
FIG. 10 is a rear view illustrating a second light-transmitting portion where a plurality of first shields are formed according to an embodiment of the present disclosure.
Figure 11:
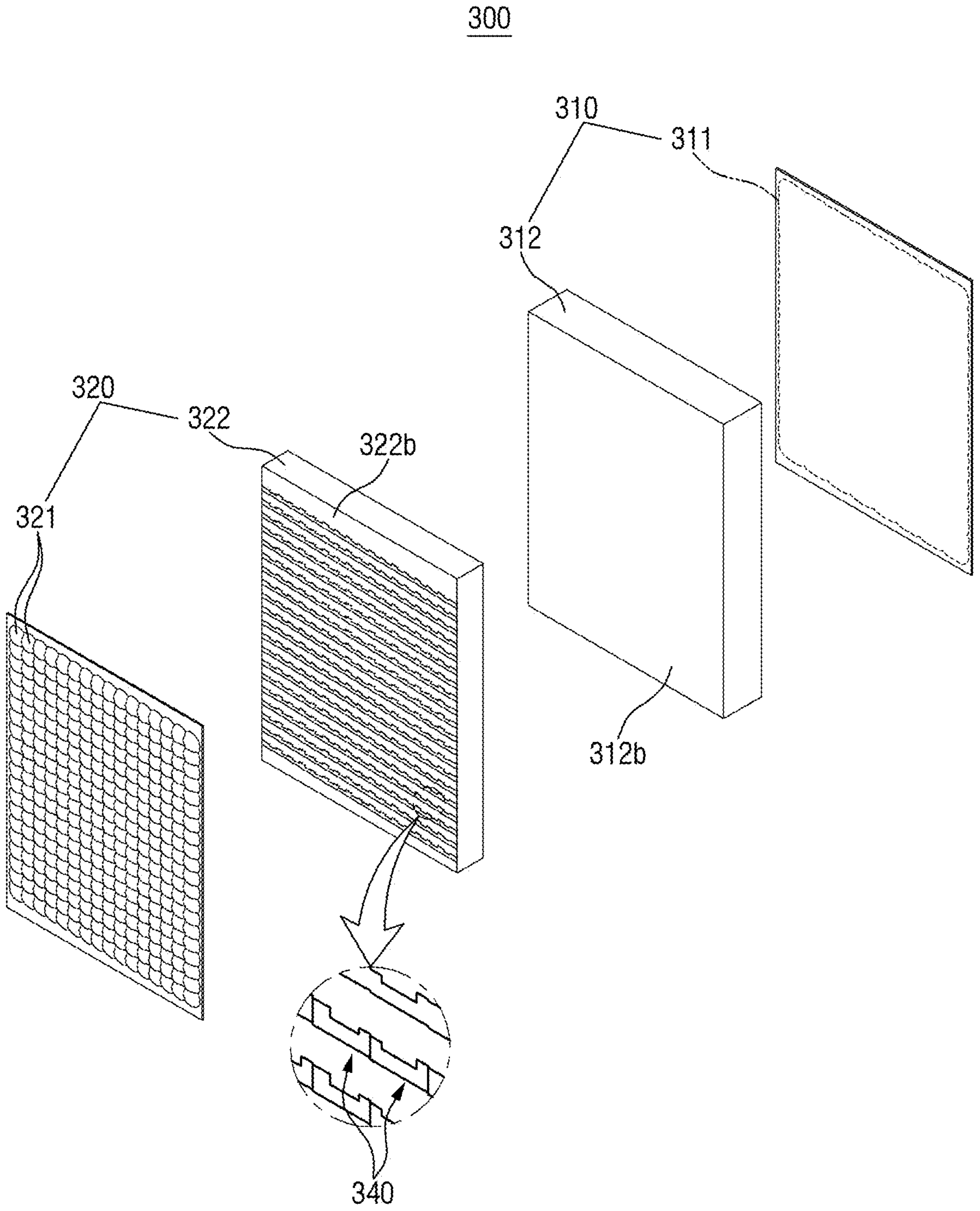
FIGS. 11 and 12 are exploded perspective views illustrating the optical portion according to an embodiment of the present disclosure.
Figure 12:
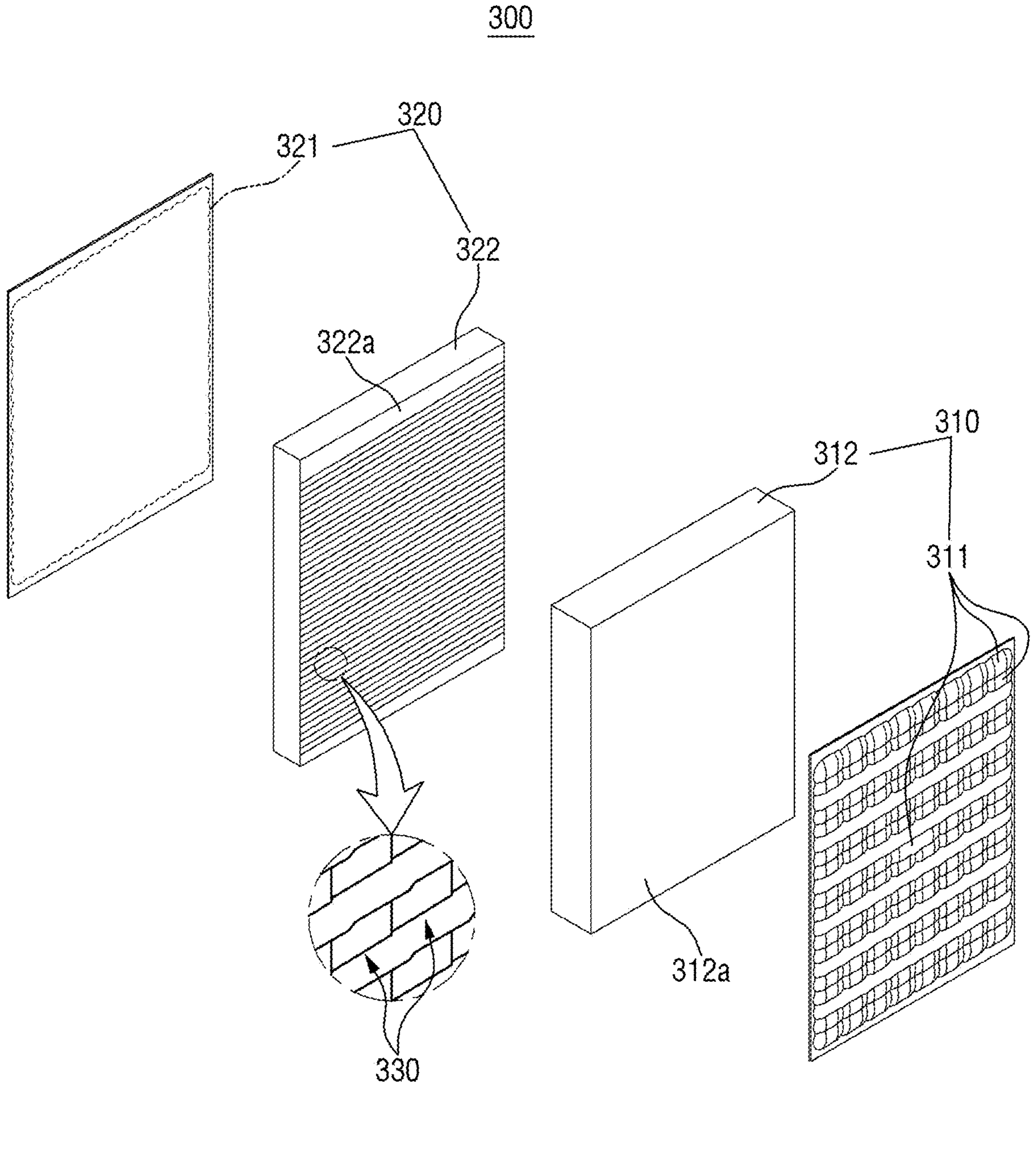
Figure 13:
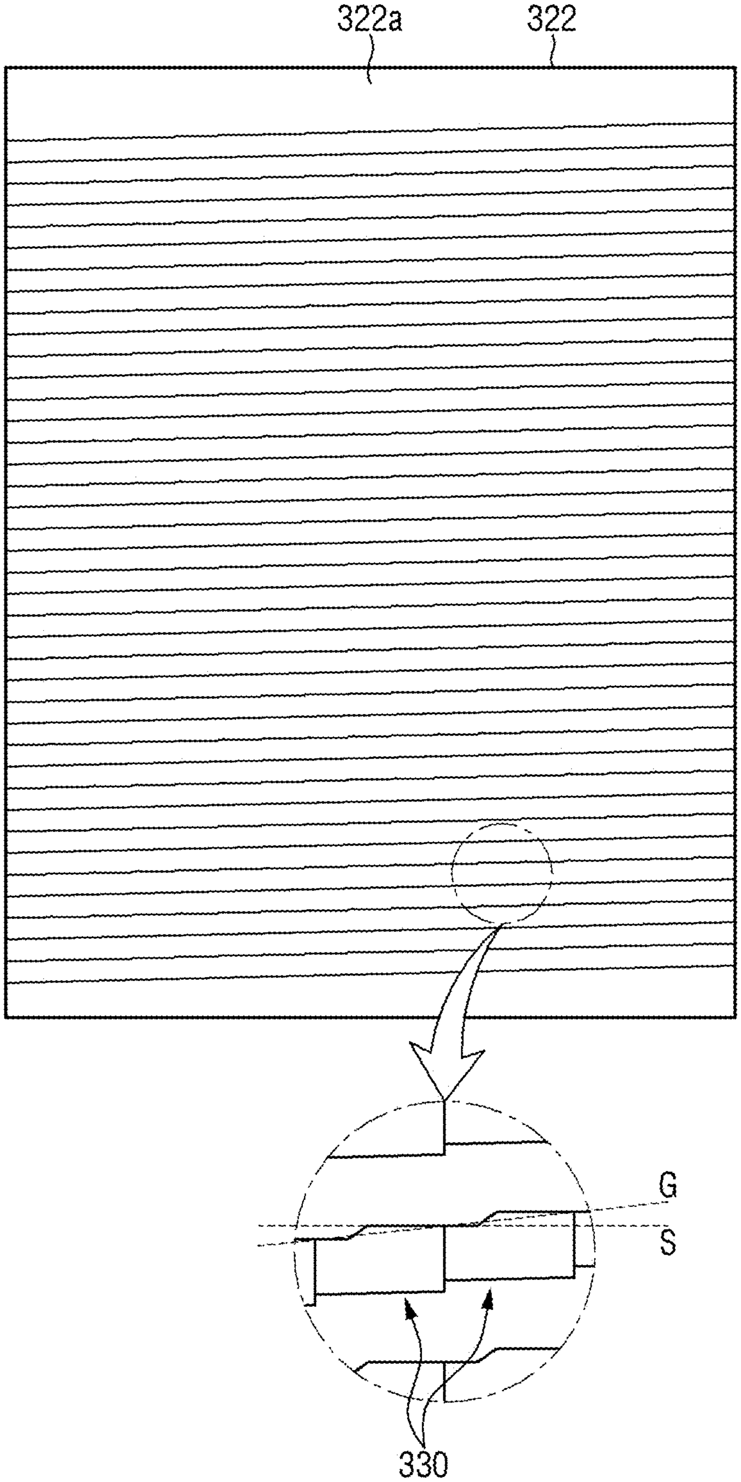
FIG. 13 is a rear view illustrating a second light-transmitting portion where a plurality of first shields are formed according to an embodiment of the present disclosure.
Figure 14:
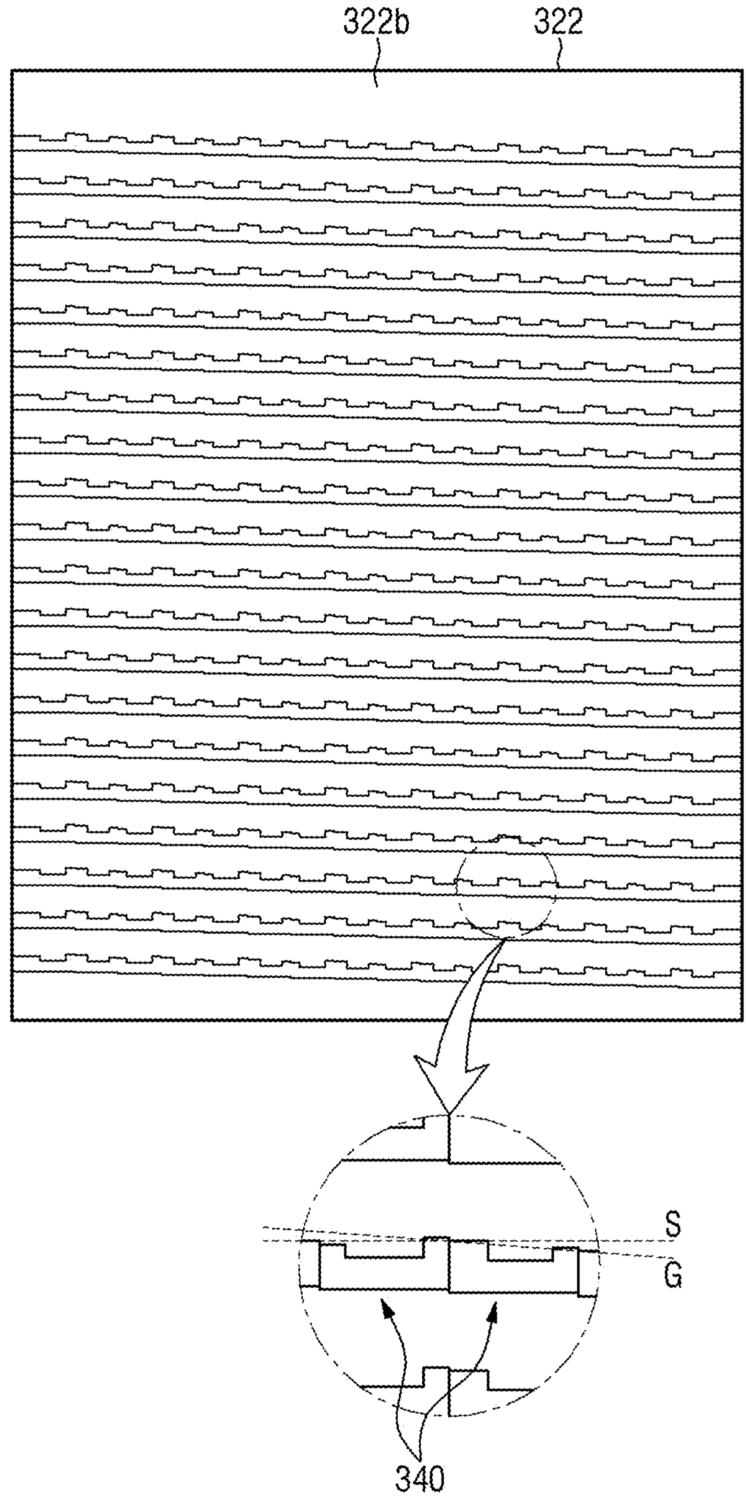
FIG. 14 is a front view illustrating a second light-transmitting portion where a plurality of second shields are formed according to an embodiment of the present disclosure.

FIG. 9 is a front view illustrating an optical portion according to an embodiment of the present disclosure, FIG. 10 is a rear view illustrating the optical portion according to an embodiment of the present disclosure, FIGS. 11 and 12 are exploded perspective views illustrating the optical portion according to an embodiment of the present disclosure, FIG. 13 is a rear view illustrating a second light-transmitting portion where a plurality of first shields are formed according to an embodiment of the present disclosure, and FIG. 14 is a front view illustrating a second light-transmitting portion where a plurality of first shields are formed according to an embodiment of the present disclosure.

Referring to FIGS. 9 through 14, the optical portion 300 according to an embodiment of the present disclosure may include an incident lens portion 310 and an emitting lens portion 320.

The incident lens portion 310 may include a plurality of incident lenses 311 and a first light-transmitting portion 312, and the emitting lens portion 320 may include a plurality of emitting lenses 321 and a second light-transmitting portion 322. In this embodiment, the plurality of incident lenses 311 and the plurality of emitting lenses 321 are described by way of example as being micro lenses having a relatively short focal length for miniaturization of the vehicle lamp 1 of the present disclosure.

The plurality of incident lenses 311 may be disposed on an incident surface 312*a* of the first light-transmitting portion 312, and the plurality of emitting lenses 321 may be disposed on an emitting surface 322*b* of the second light-transmitting portion 322. In this case, an emitting surface 312*b* of the first light-transmitting portion 312 and an incident surface 322*a* of the second light-transmitting portion 322 may abut to contact each other, so that the light incident through the plurality of incident lenses 311 may be guided by the first and second light-transmitting portions 312 and 322 to the plurality of emitting lenses 321 for emission.

In this embodiment, as explained above with reference to FIG. 3, a thickness t1 of the first light-transmitting portion 312 is described by way of example as being greater than a thickness t2 of the second light-transmitting portion 322. This configuration is to prevent light incident through one of the plurality of incident lenses 311 from proceeding not only to a corresponding emitting lens but also to an adjacent emitting lens, which may cause light to be irradiated onto an unnecessary or unintended location.

In this case, a plurality of first shields 330 may be formed through deposition or coating on either the emitting surface 312*b* of the first light-transmitting portion 312 or the incident surface 322*a* of the second light-transmitting portion 322 to block at least a part of the light proceeding toward the respective emitting lenses 321. The plurality of first shields 330 may serve to form a low-beam pattern P in which light is irradiated below a predetermined cut-off line by the vehicle lamp 1 of the present disclosure. The shape, size, and position of the plurality of first shields 330 may vary or the plurality of first shields 330 may be omitted depending on the beam pattern to be formed by the vehicle lamp 1 of the present disclosure.

In this embodiment, the plurality of first shields 330 are described by way of example as being formed on the incident surface 322*a* of the second light-transmitting portion 322. In this case, the interface where the emitting surface 312*b* of the first light-transmitting portion 312 and the incident surface 322*a* of the second light-transmitting portion 322 are in contact with each other may be understood as a focal plane where the rear focal points of the plurality of emitting lenses 321 are disposed.

The plurality of first shields 330 may be provided such that rows formed to extend in the left-right direction are aligned along the up-down direction. To prevent step differences from occurring between adjacent first shields 330 in the left-right direction, the plurality of first shields 330 may be inclined at a predetermined angle with respect to a horizontal line S. In this case, the rows formed by the plurality of first shields 330 to extend in the left-right direction may be inclined such that one side thereof is disposed above the other side thereof in the left-right direction.

The inclination of the rows in which the plurality of first shields 330 are formed to extend in the left-right direction means that a line G connecting the corresponding points of the shields 330 arranged in the left-right direction is inclined at a predetermined angle with respect to the horizontal line S.

Figure 15:
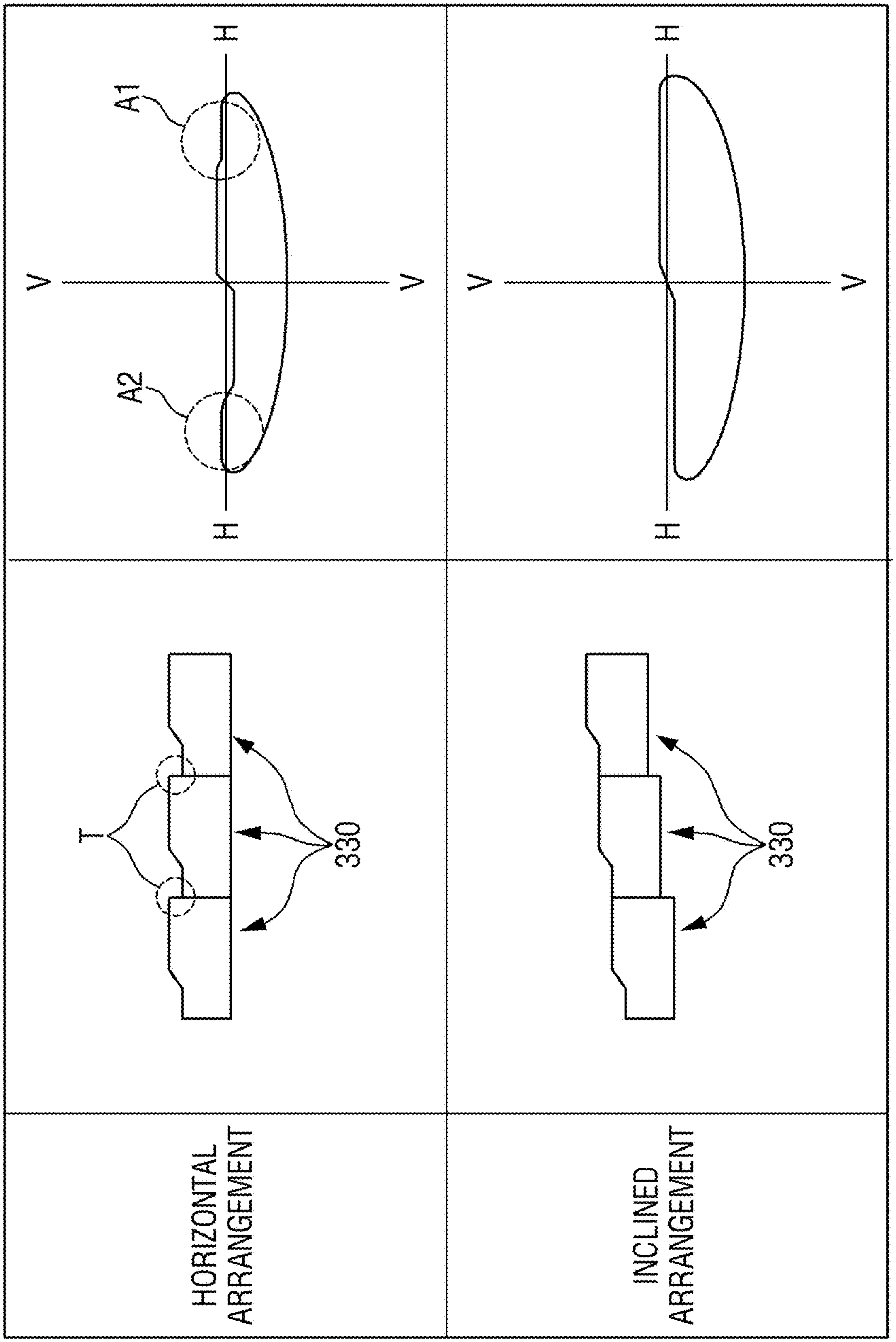
FIG. 15 is a schematic view illustrating beam patterns formed depending on the arrangement direction of first shields according to an embodiment of the present disclosure.

The rows of the plurality of first shields 330 may be inclined at a predetermined angle because, as illustrated in FIG. 15, if a step difference T occurs between adjacent shields 330 in the left-right direction, sections A1 and A2 of the cut-off line CL of the low-beam pattern P may deviate from their intended positions, which may degrade driver visibility or cause glare for the driver of the vehicle in front.

On the emitting surface 322*b* of the second light-transmitting portion 322, a plurality of second shields 340 corresponding to the respective first shields 330 may be formed. The plurality of second shields 340 may be disposed such that, similarly to the plurality of first shields 330, rows that extend in the left-right direction are arranged along the up-down direction, and each row may be formed such that one side thereof is disposed above the other side thereof in the left-right direction.

Upper ends of the plurality of second shields 340 may be disposed below upper ends of the respective first shields 330 to prevent glare from occurring in a beam pattern formed by the vehicle lamp 1 of the present disclosure.

In other words, since glare is mainly caused by light incident from below each of the plurality of emission lenses 321, the plurality of second shields 340 may block some of the light incident from below the plurality of emission lenses 321 to prevent the occurrence of glare.

In the aforementioned embodiment, the first and second sub-light sources 120 and 130 are described by way of example as being respectively disposed above and below the main light source 110. However, the present disclosure is not limited thereto, and a sub-light source may be disposed only below the main light source 110 with no sub-light source disposed above the main light source 110.

Figure 16:
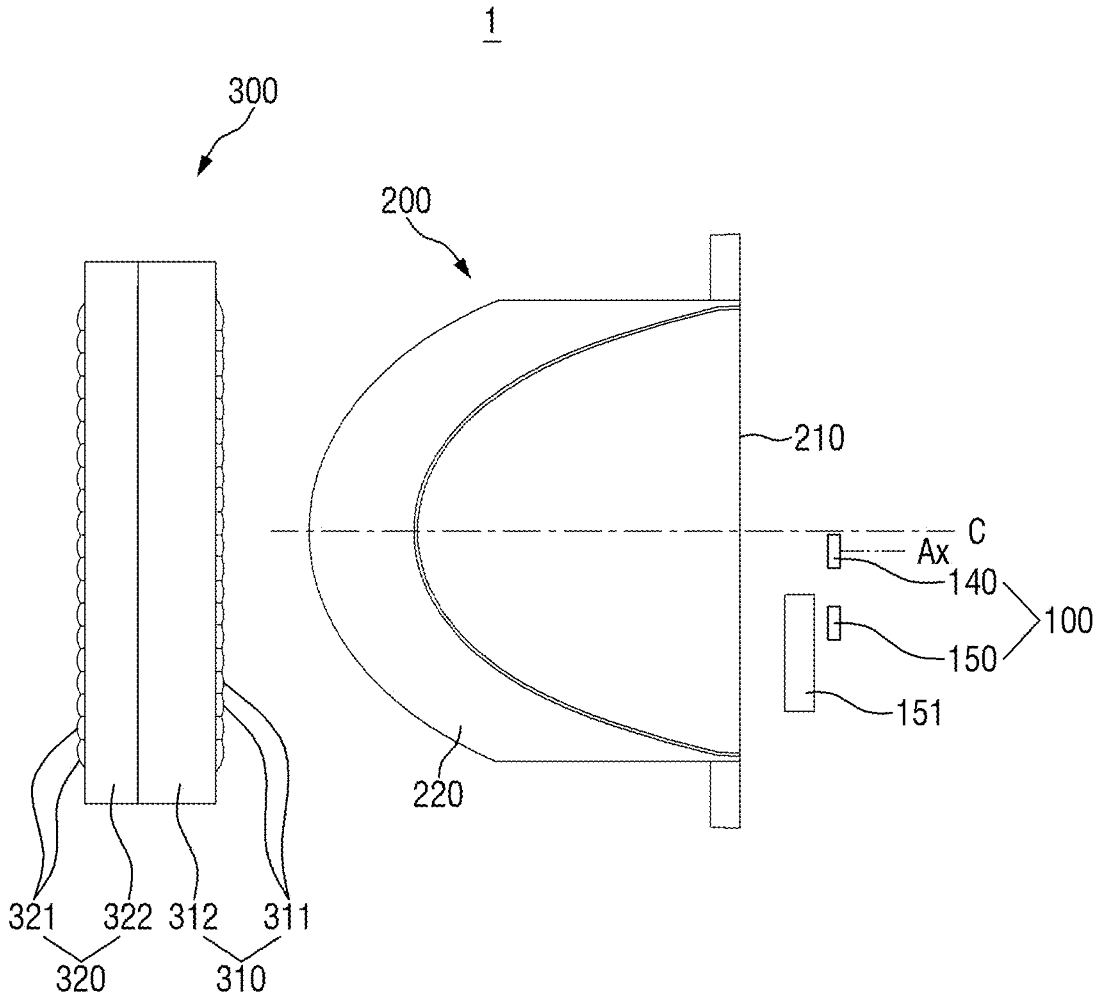
FIG. 16 is a side view illustrating a vehicle lamp according to another embodiment of the present disclosure.

FIG. 16 is a side view illustrating a vehicle lamp according to another embodiment of the present disclosure.

Referring to FIG. 16, a vehicle lamp 1 according to another embodiment of the present disclosure may include a light source portion 100, a light path adjustment portion 200, and an optical portion 300, similarly to its counterpart of the above-described embodiment. The same reference numerals are used for the components identical to those in the above-described embodiment, and detailed descriptions of their functions will be omitted.

In this embodiment, similarly to the previous embodiment, the light source portion 100 may include a main light source 140 and at least one sub-light source 150. In this embodiment, the at least one sub-light source 150 is described by way of example as being disposed below the main light source 140.

In this embodiment, the main light source 140 may be disposed below a central axis C of the light path adjustment portion 200. This configuration is intended to allow light emitted from the main light source 140 to proceed relatively upward, thereby reducing the amount of light blocked by a plurality of first shields 330 and a plurality of second shields 340, and improving light efficiency.

Here, the positioning of the main light source 140 below the central axis C of the light path adjustment portion 200 may encompass not only a case where the entire main light source 140 is disposed below the central axis C, but also a case where an optical axis Ax of the main light source 140 is disposed below the central axis C.

In this embodiment, the light generated from the at least one sub-light source 150 may be guided to be incident on the light path adjustment portion 200 by a guide lens 151 disposed in front of the at least one sub-light source 150.

In this embodiment, the at least one sub-light source 150 may be disposed not above but only below the main light source 140 because sufficient visibility can be ensured depending on the light distribution characteristics of the at least one sub-light source 150. In this case, the reflector 400 of the previous embodiment may be omitted.

Meanwhile, in this embodiment, unlike in the previous embodiment, no knurling pattern 230 may be formed on a side surface between the incident surface 210 and the emitting surface 220 of the light path adjustment portion 200. This may be understood as being exemplary for a case where glare is not caused to the drivers of surrounding vehicles or pedestrians due to light emitted through the side surface of the light path adjustment portion 200, even when the knurling pattern 230 is not formed.

Figure 17:
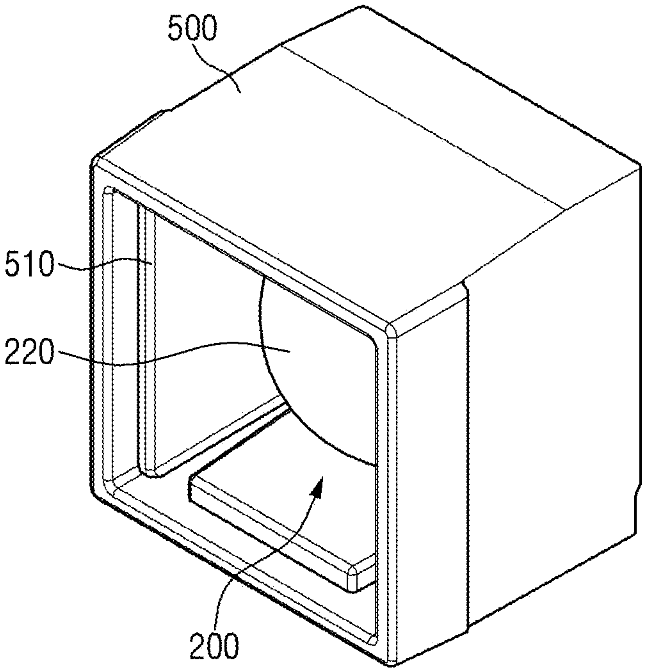
FIG. 17 is a perspective view illustrating a light path adjustment portion according to another embodiment of the present disclosure.

FIG. 17 is a perspective view illustrating a light path adjustment portion according to another embodiment of the present disclosure.

Referring to FIG. 17, a light path adjustment portion 200 according to another embodiment of the present disclosure may include a holder 500 formed on at least part of its side surface. The holder 500 may serve to allow the position of the light path adjustment portion 200 to be fixed.

In other words, when the light path adjustment portion 200 is directly fixed, the likelihood of damage to the light path adjustment portion 200 is high. Therefore, in this embodiment, the holder 500 is formed on at least part of the side surface of the light path adjustment portion 200 in a manner that does not affect its optical characteristics, thereby preventing damage to the light path adjustment portion 200 and preventing a change in optical characteristics, while still allowing the position of the light path adjustment portion 200 to be fixed.

In this case, the holder 500 may be formed integrally with the light path adjustment portion 200 or may be manufactured as a separate component and then coupled to the light path adjustment portion 200. When the holder 500 and the light path adjustment portion 200 are formed integrally, the holder 500 may be formed of the same material as the light path adjustment portion 200.

Meanwhile, the holder 500 may allow the position of not only the light path adjustment portion 200 but also the optical portion 300 to be fixed.

Figure 18:
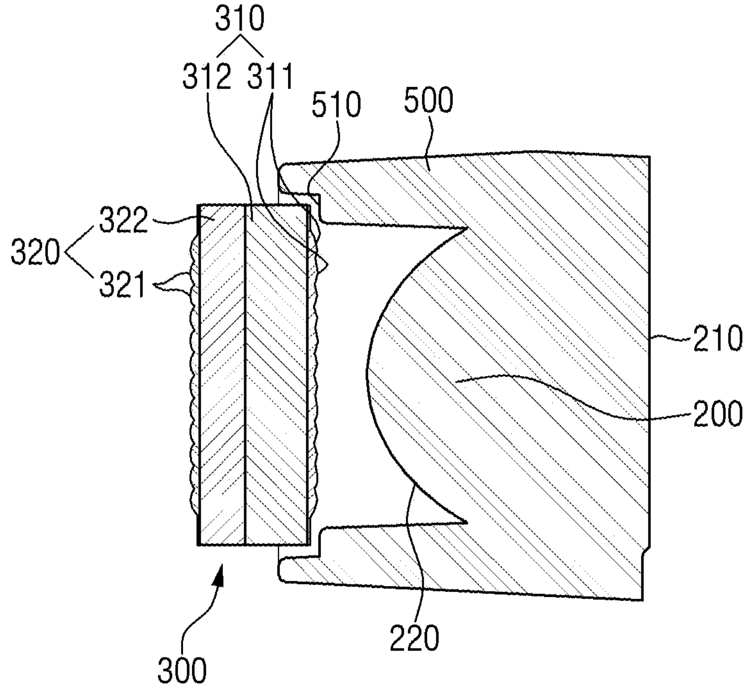
FIG. 18 is a cross-sectional view illustrating a light path adjustment portion and optical portion according to another embodiment of the present disclosure.

In other words, as illustrated in FIG. 18, the holder 500 may include a mounting portion 510 formed with a step (e.g., a recess) such that it is disposed near an edge of the optical portion 300. As a result, the optical portion 300 may be fixed in position without requiring a separate structure for fixing its position.

As described above, the vehicle lamp 1 of the present disclosure can form different beam patterns by using the main light source 110 and the at least one sub-light source 120 and 130, which are disposed at different locations (e.g., vertical locations) with respect to the central axis C of the light path adjustment portion 200. Accordingly, some components, such as the light path adjustment portion 200 and the optical portion 300, that are used for forming different beam patterns can be shared, and thus, a separate optical system is not required depending on the beam pattern, resulting in simplified configuration and reduced cost.

Those skilled in the art will understand that the present disclosure may be implemented in other specific forms without changing the technical spirit or essential features. Therefore, the above-described embodiments should be understood as illustrative in all aspects and not as limiting. The scope of the present disclosure should be indicated by the claims described below, and all modifications or variations derived from the meaning and scope of the claims and their equivalents should be construed as being included in the scope of the present disclosure.

What is claimed is:

1. A vehicle lamp comprising:

a light source portion that generates light, the light source portion includes a main light source for forming a main beam pattern, and at least one sub-light source for generating light for forming a sub-beam pattern;

a light path adjustment portion that adjusts a path of the light emitted from the light source portion; and an optical portion that transmits at least a portion of the light incident from the light path adjustment portion to allow at least one beam pattern to be formed, wherein the optical portion includes:

an incident lens portion, which includes a first light-transmitting portion and a plurality of incident lenses disposed on an incident surface of the first light-transmitting portion; and an emitting lens portion, which includes a second light-transmitting portion having an incident surface thereof facing an emitting surface of the first light-transmitting portion and a plurality of emission lenses disposed on an emitting surface of the second light-transmitting portion to correspond to the plurality of incident lenses.

2. The vehicle lamp of claim 1, further comprising:

a reflector that reflects at least a portion of the light emitted from the at least one sub-light source to cause it to proceed toward the optical portion.

3. The vehicle lamp of claim 1, wherein each of the at least one sub-light source is disposed above or below the main light source.

4. The vehicle lamp of claim 1, wherein the at least one sub-light source is disposed below the main light source.

5. The vehicle lamp of claim 1, wherein a thickness of the first light-transmitting portion is greater than a thickness of the second light-transmitting portion.

6. The vehicle lamp of claim 1, further comprising:

at least one guide lens that guides the light emitted from the at least one sub-light source to be incident on the light path adjustment portion.

7. The vehicle lamp of claim 6, wherein the at least one guide lens includes a diffusion pattern formed on at least one of an incident surface or an emitting surface thereof for diffusing light.

8. The vehicle lamp of claim 1, further comprising:

a holder formed on at least a portion of a side surface of the light path adjustment portion to fix a position of the light path adjustment portion.

9. The vehicle lamp of claim 8, wherein the holder includes a mounting portion formed at a front end thereof for mounting the optical portion therein.

10. The vehicle lamp of claim 1, further comprising:

a plurality of first shields disposed between the first light-transmitting portion and the second light-transmitting portion, and configured to block a portion of light that proceeds toward the plurality of emission lenses.

11. The vehicle lamp of claim 10, further comprising:

a plurality of second shields disposed in front of the plurality of first shields, wherein upper ends of the plurality of second shields are disposed below upper ends of corresponding first shields among the plurality of first shields.

12. The vehicle lamp of claim 1, wherein the at least one sub-light source includes: a first sub-light source disposed above the main light source; and a second sub-light source disposed below the main light source.

13. The vehicle lamp of claim 12, wherein the first sub-light source is disposed near a top end of the light path adjustment portion.

14. The vehicle lamp of claim 12, wherein light emitted from the first sub-light source is guided to be incident on the light path adjustment portion by a first guide lens, wherein light emitted from the second sub-light source is guided to be incident on the light path adjustment portion by a second guide lens, and wherein the second guide lens is disposed farther from the light path adjustment portion than the first guide lens.

15. The vehicle lamp of claim 14, wherein the first guide lens is inclined front-downward to allow the light emitted from the first sub-light source to proceed with a front-downward inclination.

* * * * *